(12) United States Patent
Gerber et al.

(10) Patent No.: US 12,467,289 B2
(45) Date of Patent: Nov. 11, 2025

(54) MOTOR VEHICLE SWING DOOR ARRANGEMENT

(71) Applicant: Dr. Ing. h.c. F. Porsche Aktiengesellschaft, Stuttgart (DE)

(72) Inventors: Harald Gerber, Walheim (DE); Stefan Adams, Pforzheim-Hohenwart (DE); Stefan Part, Rutesheim (DE); Patrick Wiedmaier, Rottenburg (DE)

(73) Assignee: DR. ING. H.C.F. PORSCHE AKTIENGESELLSCHAFT, Stuttgart (DE)

( * ) Notice: Subject to any disclaimer, the term of this patent is extended or adjusted under 35 U.S.C. 154(b) by 0 days.

(21) Appl. No.: 18/757,522

(22) Filed: Jun. 28, 2024

(65) Prior Publication Data

US 2025/0012121 A1   Jan. 9, 2025

(30) Foreign Application Priority Data

Jul. 4, 2023   (DE) ..................... 10 2023 117 611.0

(51) Int. Cl.
*E05B 81/20*   (2014.01)
*E05B 77/12*   (2014.01)
(Continued)

(52) U.S. Cl.
CPC .............. *E05B 81/20* (2013.01); *E05B 77/12* (2013.01); *E05B 81/14* (2013.01); *E05F 15/616* (2015.01);
(Continued)

(58) Field of Classification Search
CPC .......... E05B 81/20; E05B 81/14; E05B 77/02; E05B 77/12; E05F 15/72; E05F 15/616
See application file for complete search history.

(56) References Cited

U.S. PATENT DOCUMENTS 4,269,440 A * 5/1981 Gelhard ................. E05B 81/54
                                                        292/201
6,471,259 B1 * 10/2002 Weyerstall ............. E05B 81/14
                                                        292/216
(Continued)

FOREIGN PATENT DOCUMENTS

DE   102014205371 A1 *  9/2015 ............ B60J 5/0416
DE   202016104563 U1 * 12/2017
(Continued)

OTHER PUBLICATIONS

English translation of DE202016104563U1 (Year: n/a).*

*Primary Examiner* — Justin B Rephann
(74) *Attorney, Agent, or Firm* — LEYDIG, VOIT & MAYER, LTD.

(57) ABSTRACT

A motor arrangement with a door which can be swung between a closed and open position, including a door locking arrangement having an electrically actuated door latch configured to be moved between a locked and unlocked position, and a push-open arrangement for pushing open the door body from its closed position. The push-open arrangement includes a plunger, an actuator driving the plunger, and a controller configured to unlock the door locking arrangement when an electronic opening request is received and then electrically supply the actuator in a normal mode, such that the swing door is pushed from its closed to open position. The controller is configured to switch to a crash mode and to supply the actuator with an electrical power which is increased by at least 50% compared to the normal power when an opening request is received.

16 Claims, 1 Drawing Sheet

(51) Int. Cl.
*E05B 81/14* (2014.01)
*E05F 15/616* (2015.01)
*E05F 15/72* (2015.01)

(52) U.S. Cl.
CPC ......... *E05F 15/72* (2015.01); *E05Y 2900/531* (2013.01)

(56) References Cited

U.S. PATENT DOCUMENTS

| | | | | |
|---|---|---|---|---|
| 10,087,671 | B2 * | 10/2018 | Linden | E05B 81/56 |
| 10,227,810 | B2 * | 3/2019 | Linden | E05B 81/64 |
| 11,008,797 | B2 * | 5/2021 | Termine | E05F 15/622 |
| 11,098,504 | B2 * | 8/2021 | Taylor | E05F 15/622 |
| 2001/0022456 | A1 * | 9/2001 | Kitagawa | B62D 25/04 |
| | | | | 296/187.12 |
| 2004/0232707 | A1 * | 11/2004 | Kachouh | E05B 81/14 |
| | | | | 292/216 |
| 2007/0265753 | A1 * | 11/2007 | Cantu | B60R 21/01 |
| | | | | 701/45 |
| 2018/0038146 | A1 * | 2/2018 | Linden | B60J 1/08 |
| 2018/0038147 | A1 * | 2/2018 | Linden | B60J 5/047 |
| 2018/0171681 | A1 * | 6/2018 | Hunt | E05B 81/40 |
| 2019/0145146 | A1 * | 5/2019 | Linden | B60J 1/08 |
| | | | | 49/28 |
| 2019/0153768 | A1 * | 5/2019 | Termine | E05F 15/622 |
| 2019/0203508 | A1 * | 7/2019 | Harajli | E05F 15/616 |
| 2020/0123816 | A1 * | 4/2020 | Taylor | E05B 81/20 |
| 2020/0386034 | A1 * | 12/2020 | Battlogg | B60Q 9/008 |
| 2021/0002930 | A1 * | 1/2021 | Guerin | E05B 85/16 |
| 2021/0254389 | A1 * | 8/2021 | Termine | E05F 15/622 |
| 2021/0301561 | A1 * | 9/2021 | Cumbo | E05B 81/06 |
| 2022/0021372 | A1 | 1/2022 | Nakamura et al. | |
| 2023/0034544 | A1 * | 2/2023 | Mozola | E05B 81/20 |
| 2023/0112684 | A1 * | 4/2023 | Cetnar | E05B 81/06 |
| | | | | 70/278.7 |
| 2025/0027346 | A1 * | 1/2025 | Klocke | E05B 81/70 |
| 2025/0146335 | A1 * | 5/2025 | Bruecklmeier | E05B 17/10 |

FOREIGN PATENT DOCUMENTS

| | | |
|---|---|---|
| DE | 102016115439 A1 | 2/2018 |
| DE | 102022111504 A1 | 11/2023 |
| DE | 102022117599 A1 | 1/2024 |
| WO | WO 2019086279 A1 | 5/2019 |
| WO | WO 2022175224 A1 | 8/2022 |

* cited by examiner

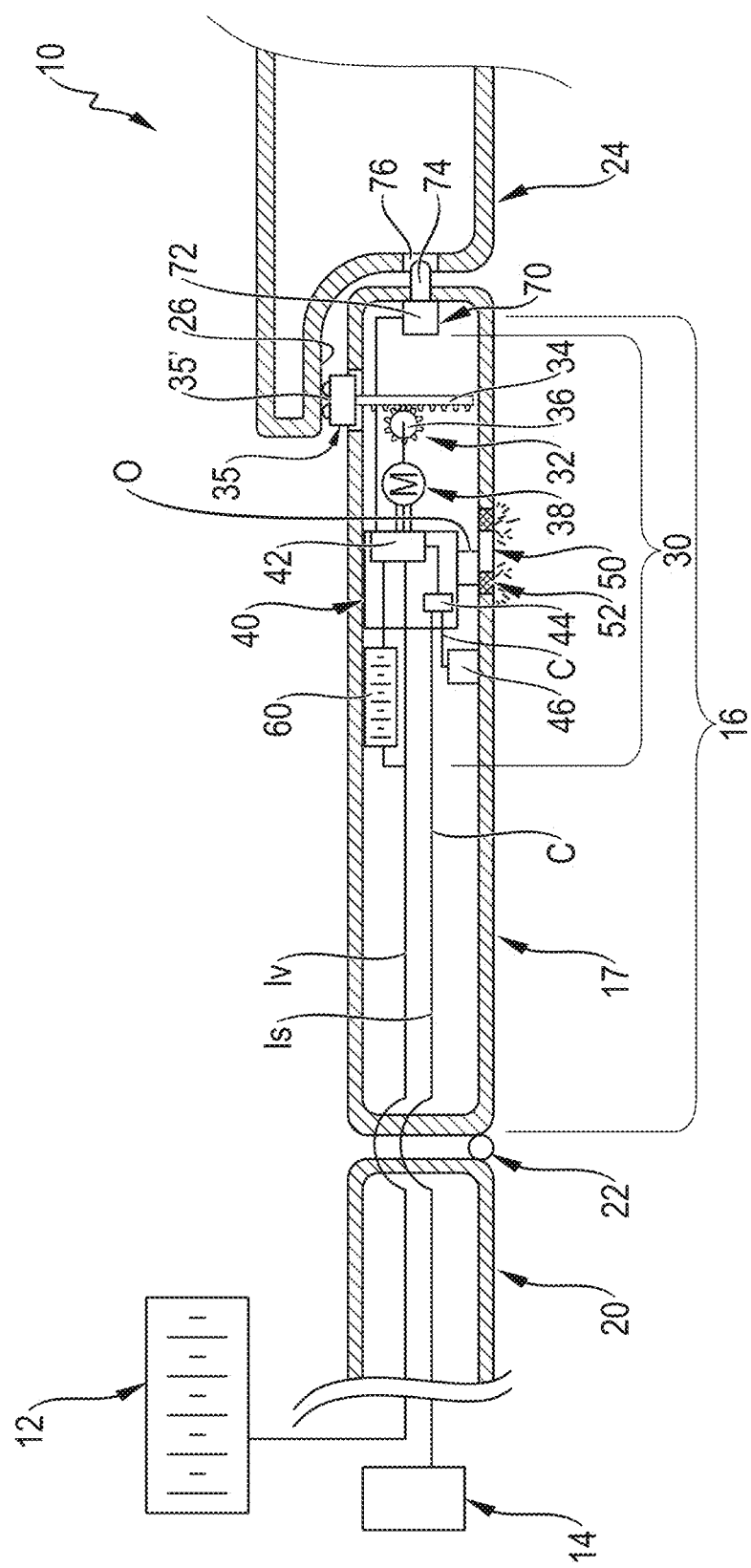

MOTOR VEHICLE SWING DOOR ARRANGEMENT

CROSS REFERENCE TO RELATED APPLICATIONS

This application claims benefit to German Patent Application No. DE 10 2023 117 611.0, filed on Jul. 4, 2023, which is hereby incorporated by reference herein.

FIELD

The invention relates to a motor vehicle swing door arrangement having a swing door.

BACKGROUND

A vehicle swing door arrangement with a push-open door arrangement is used in particular with a handleless vehicle swing door to push the unlocked vehicle swing door open from its closed position into a slightly open gripping position, from which it can be manually opened further into an access position.

A typical motor vehicle swing door arrangement with a push-open door arrangement is known from WO 2019 86 279 A1. Other typical motor vehicle swing door arrangements are known from US 2022 021 372 A1 and WO 2022 175 224 A1. The push-open door arrangements push the relevant vehicle swing door out of the closed position with a defined power or with a defined pushing force. This pushing force must be high enough to ensure that the door opens reliably even under unfavorable conditions, for example if the vehicle swing door is iced over. A pushing force of around 500 N is typically sufficient for this. However, this pushing force may not be sufficient in special circumstances, especially if the vehicle swing door arrangement is so distorted after a vehicle crash that the swing door is jammed or tilted. However, if the pushing force is set to 1000 N as standard, for example, either the service life of the push-open door arrangement is reduced or the push-open door arrangement must be designed to be mechanically more stable, which has an unfavorable effect on the manufacturing costs.

SUMMARY

In an embodiment, the present disclosure provides a motor vehicle swing door arrangement with a swing door, the door body of which can be swung between a closed position and an open position, the motor vehicle swing door arrangement comprising a door locking arrangement having an electrically actuated door latch configured to be moved between a locked position and an unlocked position and a push-open door arrangement for pushing open the door body from its closed position. The push-open door arrangement includes a push plunger and a push actuator driving the push plunger, and a door controller configured to unlock the door locking arrangement when an electronic opening request is received and then electrically supply the push actuator in a normal operating mode with a normal operating power, such that the swing door is pushed from its closed position into an open position. The door controller is configured to switch to a crash operating mode after input of a crash signal, and the door controller is configured to supply the push actuator with an electrical crash operating power which is increased by at least 50% compared to the normal operating power when an electronic opening request is received.

BRIEF DESCRIPTION OF THE DRAWINGS

Subject matter of the present disclosure will be described in even greater detail below based on the exemplary FIGURES. All features described and/or illustrated herein can be used alone or combined in different combinations. The features and advantages of various embodiments will become apparent by reading the following detailed description with reference to the attached drawings, which illustrate the following:

FIG. 1 schematically shows a motor vehicle swing door arrangement with a door locking arrangement, a push-open door arrangement and a door control unit.

DETAILED DESCRIPTION

In an embodiment, the present invention provides a motor vehicle swing door arrangement having a swing door, the door body of which can be pushed from its closed position into an open position by a push-open door arrangement with a push plunger, but cannot be pulled into a closed position.

In an embodiment, the present invention provides a motor vehicle swing door arrangement with an inexpensive and reliable push-open door arrangement.

The motor vehicle swing door arrangement according to an embodiment of the invention has a swing door whose door body can be swung between a closed position and an open position. Preferably, it is a swing door that is swung about an essentially vertical swinging axis. It is preferred that the swing door does not have a handle on the outside with which the swing door can be pulled out of its closed position.

The motor vehicle swing door arrangement has a door locking arrangement with an electrically actuated door latch that can be moved between a locked position and an unlocked position. The door latch mechanically locks the swing door or the door body in its closed position so that it cannot open. In the unlocked position of the door latch, the swing door or the door body is no longer locked and can therefore be moved manually or mechanically from its closed position to an open position.

The motor vehicle swing door arrangement has a push-open door arrangement for pushing open the door body from its closed position, wherein the push-open door arrangement has an electrically actuated push plunger which only rests with its distal push plunger side on a mating surface. The push plunger is activated by a push actuator.

In principle, the push plunger can have any suitable shape, i.e. it does not necessarily have to be plunger-shaped. The push-open door arrangement is only suitable for pushing the door body from its closed position into a gripping position and is not suitable for pulling the door body into its closed position or pushing the door body into a fully open position.

The push actuator is preferably purely electric and drives the push plunger directly or indirectly, for example via a suitable transmission.

The motor vehicle swing door arrangement has an electronic door control unit which, on receipt of an electronic opening request, unlocks the door locking arrangement or instructs the door locking arrangement to move the door latch into the unlocked position, and which then supplies the push actuator with electrical power so that the swing door or the door body is pushed or pushed open into an open position or into the gripping position.

In normal operating mode, the door control unit supplies the push actuator with an electrical normal operating power that generates a pushing force in the order of 500 N, for example.

The door control unit has a crash signal port for receiving a vehicle crash signal. If a crash signal is received at the crash signal port, the door control unit switches to crash operating mode, which remains active until it is reset, i.e. it is no longer changed. As soon as an electronic opening request is received in the crash operating mode, the door control unit supplies the push actuator with a crash operating power that is increased by at least 50% compared to the normal operating power, preferably by at least 100%, and generates a pushing force of around 1000 N, for example.

In this way, a considerably higher pushing force of the push-open door arrangement is only available in the event of a crash, but the push-open door arrangement and in particular the electric push actuator can be designed for the considerably lower normal operating power, so that the installation space, weight and costs of the push-open door arrangement are relatively low.

Preferably, a crash sensor is provided fixed to the vehicle and/or door, which is connected to the crash signal port of the door control unit via a signal connection. The crash sensor sends a crash signal to the door control unit in the event of a crash. A door-mounted crash sensor ensures a high level of operational safety, as an interruption of electrical signal lines between the swing door and the vehicle-mounted crash sensor system does not impair the functionality of the door control unit.

Preferably, the door control unit is arranged in the door body. This measure also ensures the functionality of the door control unit in the event of a crash.

Preferably, a separate door control battery is electrically assigned to the door control unit and the push actuator, both of which are preferably arranged in the door body of the swing door or on the swing door. The door control battery also serves to ensure the functionality of the push-open door arrangement and, if necessary, the door locking arrangement in the event of a crash, even if the electrical lines between the swing door and the rest of the vehicle electrics are interrupted.

Preferably, an optical operating indicator is spatially assigned to the swing door, which is connected to the door control unit via a signal connection, wherein the door control unit causes the optical operating indicator to output an optical crash operating signal when the crash operating mode is activated. The crash operating signal can, for example, be a conspicuous flashing light that makes it easier to find a door opening button.

In the following, an example embodiment of the invention is explained in more detail with reference to the FIGURE.

The FIGURE shows a schematic horizontal section of a motor vehicle swing door arrangement 10. The motor vehicle swing door arrangement 10 has a vehicle-fixed door hinge post 20, a swing door 16 rotatably suspended therefrom by a substantially vertical pivot joint 22 and a vehicle-fixed stop post 24. A vehicle-mounted low-voltage vehicle battery 12 and a vehicle-mounted or body-mounted crash sensor 14 are also provided.

A door locking arrangement 70 and a push-open door arrangement 30 with a door control unit 40 are arranged in a door body 17 of the swing door 16.

The door locking arrangement 70 comprises an electrically actuated door latch 74, which in its locked position engages a corresponding latch opening 76 in the stop post 24, and an electric door latch actuator 72, which moves the door latch 74 between its locked position and its unlocked position.

The push-open door arrangement 30 for pushing open the door body 17 from its closed position shown in the FIGURE has a door control unit 40, a separate door control battery 60 and a door push mechanism, which is essentially formed by a push actuator 38, a transmission 36 and a push plunger 35, which is movable via the transmission 36 by the push actuator 38 between a rest position, which is shown in the FIGURE, and a pushed-out gripping position. In the present case, the transmission 36 is formed by a drive pinion 32 and a threaded rod 34. The drive pinion 32 is driven by the push actuator 38, which is designed as an electric motor. When the push actuator 38 is activated in the closed position of the swing door 16 shown in the FIGURE, the distal plunger side 35' of the push plunger 35 pushes against a corresponding mating surface 26 of the vehicle-fixed stop post 24, so that the swing door 16 or the door body 17 is pushed open from the closed position shown by a few centimeters into a gripping position when the locking arrangement 70 is unlocked.

A separate door-mounted crash sensor 46 is arranged in the swing door 16 or within the door body 17, which is connected to the door control unit 40 via a signal connection and which outputs an electrical crash signal to the door control unit 40 in the event of a detected vehicle crash. The vehicle-mounted crash sensor 14 is also connected to the door control unit 40 via a signal line ls. The vehicle-mounted vehicle battery 12 supplies both the door control battery 60, which is designed as a rechargeable battery, and the door control unit 40 directly via an electrical supply line lv. If the supply line lv is interrupted, the door control battery 60 supplies the door control unit 40 with electrical energy.

The door control unit 40 arranged in the door body 17 has a crash signal evaluator 44, which outputs a crash operation signal to a power control unit 42 of the door control unit 40 when a crash operating signal C is received from one of the two crash sensors 14, 46. As soon as a crash operating signal is received by the power control unit 42, it switches permanently from its normal operating mode, in which the push actuator 38 is operated with an electrical normal operating power, to a crash operating mode, in which the push actuator 38 is operated with an electrical crash operating power that is increased by 150% compared to the normal operating power, for example, until it is reset. In the normal operating mode, a pushing force of approximately 400 N is generated, whereas in the crash operating mode, a pushing force in the order of 1000 N is generated.

An electronic opening button 50 and an optical operating indicator 52 arranged in a ring around the opening button 50 are provided on the outside of the swing door 16 or the door body 17, both of which are connected to the door control unit 40 via a signal connection. As soon as the door control unit 40 or the power control unit 42 are running in crash operating mode, the optical operating indicator 52 is instructed to permanently display an optical crash operating signal to make it easier to find the opening button 50, for example a flashing signal. When the opening button 50 is actuated in the crash operating mode, an electronic opening request O is output by the opening button 50 via a signal connection to the door control unit 40, which then unlocks the door locking arrangement 70 and supplies the push actuator 38 with the electrical crash operating power.

While subject matter of the present disclosure has been illustrated and described in detail in the drawings and foregoing description, such illustration and description are to be considered illustrative or exemplary and not restrictive. Any statement made herein characterizing the invention is also to be considered illustrative or exemplary and not restrictive as the invention is defined by the claims. It will be understood that changes and modifications may be made, by those of ordinary skill in the art, within the scope of the following claims, which may include any combination of features from different embodiments described above.

The terms used in the claims should be construed to have the broadest reasonable interpretation consistent with the foregoing description. For example, the use of the article "a" or "the" in introducing an element should not be interpreted as being exclusive of a plurality of elements. Likewise, the recitation of "or" should be interpreted as being inclusive, such that the recitation of "A or B" is not exclusive of "A and B," unless it is clear from the context or the foregoing description that only one of A and B is intended. Further, the recitation of "at least one of A, B and C" should be interpreted as one or more of a group of elements consisting of A, B and C, and should not be interpreted as requiring at least one of each of the listed elements A, B and C, regardless of whether A, B and C are related as categories or otherwise. Moreover, the recitation of "A, B and/or C" or "at least one of A, B or C" should be interpreted as including any singular entity from the listed elements, e.g., A, any subset from the listed elements, e.g., A and B, or the entire list of elements A, B and C.

The invention claimed is:

1. A motor vehicle swing door arrangement, the motor vehicle swing door arrangement comprising:
 a swing door comprising a door body configured to be swung between a closed position and an open position;
 a door locking arrangement having an electrically actuated door latch configured to be moved between a locked position and an unlocked position; and
 a push-open door arrangement for pushing open the door body from its closed position, wherein the push-open door arrangement comprises:
  a push plunger and a push actuator driving the push plunger, and
  a door controller configured to unlock the door locking arrangement when an electronic opening request is received and then electrically supply the push actuator in a normal operating mode with a normal operating power, such that the swing door is pushed from its closed position into the open position,
 wherein the door controller is configured to switch to a crash operating mode after input of a crash signal, and the door controller is configured to supply the push actuator with an electrical crash operating power which is increased by at least 50% compared to the normal operating power when the electronic opening request is received,
 wherein a crash sensor is provided fixed to a vehicle in which the motor vehicle swing door arrangement is arranged and/or fixed to the swing door, wherein the crash sensor is connected to the door controller via a signal connection, and wherein the crash sensor is configured to send the crash signal to the door controller in an event of a crash, and
 wherein the swing door is spatially associated with an optical operating indicator which is connected to the door controller, wherein the door controller is configured to instruct the optical operating indicator to display an optical crash operating signal when the crash operating mode is activated.

2. The motor vehicle swing door arrangement according to claim 1, wherein the door controller is arranged in the door body.

3. The motor vehicle swing door arrangement according to claim 1, wherein a door control battery is electrically associated with the door controller and the push actuator.

4. The motor vehicle swing door arrangement according to claim 3, wherein a vehicle-mounted battery is configured to electrically supply the door controller via a supply line and the door control battery, and wherein the door control battery is configured to electrically supply the door controller via a second supply line when the vehicle-mounted battery is interrupted from the door controller.

5. The motor vehicle swing door arrangement according to claim 3, wherein the door control battery is arranged inside the door body.

6. The motor vehicle swing door arrangement according to claim 1, wherein the normal operating power of the push actuator is from 400 N to 500 N.

7. The motor vehicle swing door arrangement according to claim 6, wherein the electrical crash operating power is 1000 N.

8. The motor vehicle swing door arrangement according to claim 1, wherein the push-open door arrangement further comprises a drive pinion and a threaded rod, wherein the push actuator is configured to rotate the drive pinion, and wherein the threaded rod is configured to receive the rotation of the drive pinion and drive the push plunger linearly towards and/or against a vehicle.

9. The motor vehicle swing door arrangement according to claim 1, further comprising the optical operating indicator provided on an external surface of the swing door, wherein the optical operating indicator is configured to display the optical crash operating signal after the input of the crash signal.

10. A motor vehicle swing door arrangement, the motor vehicle swing door arrangement comprising:
 a swing door comprising a door body configured to be swung between a closed position and an open position;
 a door locking arrangement having an electrically actuated door latch configured to be moved between a locked position and an unlocked position; and
 a push-open door arrangement for pushing open the door body from its closed position, wherein the push-open door arrangement comprises:
  a push plunger and a push actuator driving the push plunger, and
  a door controller configured to unlock the door locking arrangement when an electronic opening request is received and then electrically supply the push actuator in a normal operating mode with a normal operating power, such that the swing door is pushed from its closed position into the open position,
 wherein the door controller is configured to switch to a crash operating mode after input of a crash signal, and the door controller is configured to supply the push actuator with an electrical crash operating power which is increased by at least 50% compared to the normal operating power when the electronic opening request is received,
 wherein a door control battery is electrically associated with the door controller and the push actuator,
 wherein a vehicle-mounted battery is configured to electrically supply the door controller via a supply line and the door control battery, and wherein the door control battery is configured to electrically supply the door controller via a second supply line when the vehicle-mounted battery is interrupted from the door controller.

11. The motor vehicle swing door arrangement according to claim 10, wherein the door control battery is arranged inside the door body.

12. The motor vehicle swing door arrangement according to claim 10, wherein the normal operating power of the push actuator is from 400 N to 500 N.

13. The motor vehicle swing door arrangement according to claim 12, wherein the electrical crash operating power is 1000 N.

14. The motor vehicle swing door arrangement according to claim 10, wherein the push-open door arrangement further comprises a drive pinion and a threaded rod, wherein the push actuator is configured to rotate the drive pinion, and wherein the threaded rod is configured to receive the rotation of the drive pinion and drive the push plunger linearly towards and/or against a vehicle.

15. The motor vehicle swing door arrangement according to claim 10, wherein the door controller is arranged in the door body.

16. The motor vehicle swing door arrangement according to claim 10, wherein a crash sensor is provided fixed to a vehicle in which the motor vehicle swing door arrangement is arranged and/or fixed to the swing door, wherein the crash sensor is connected to the door controller via a signal connection, wherein the crash sensor is configured to send the crash signal to the door controller in an event of a crash, wherein the motor vehicle swing door arrangement further comprises an optical operating indicator provided on an external surface of the swing door, wherein the optical operating indicator is configured to display an optical crash operating signal after the input of the crash signal.

* * * * *